(12) United States Patent
Heiser et al.

(10) Patent No.: US 9,313,692 B2
(45) Date of Patent: Apr. 12, 2016

(54) METHODS AND NODES FOR RADIO COMMUNICATION WITH A USER EQUIPMENT

(75) Inventors: Franz Heiser, Järfälla (SE); Jacob Österling, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 504 days.

(21) Appl. No.: 13/521,277

(22) PCT Filed: May 7, 2012

(86) PCT No.: PCT/SE2012/050480
§ 371 (c)(1),
(2), (4) Date: Jul. 10, 2012

(87) PCT Pub. No.: WO2013/169149
PCT Pub. Date: Nov. 14, 2013

(65) Prior Publication Data
US 2013/0294419 A1    Nov. 7, 2013

(51) Int. Cl.
*H04J 3/00* (2006.01)
*H04W 28/16* (2009.01)
(Continued)

(52) U.S. Cl.
CPC ............. *H04W 28/16* (2013.01); *H04L 5/0023* (2013.01); *H04L 5/0035* (2013.01); *H04L 25/03891* (2013.01); *H04W 72/0453* (2013.01); *H04W 88/085* (2013.01)

(58) Field of Classification Search
USPC .......................................................... 370/336
See application file for complete search history.

(56) References Cited

U.S. PATENT DOCUMENTS

2006/0034239 A1*   2/2006  Abeta et al. ................... 370/341
2007/0091896 A1    4/2007  Liu
(Continued)

FOREIGN PATENT DOCUMENTS

CN    201323660 A    10/2009
CN    102083077 A     6/2011
(Continued)

OTHER PUBLICATIONS

Jungnickel V et al: "Coordinated Multipoint Trials in the Downlink", Globecom Workshops, 2009 IEEE, IEEE, Nov. 30, 2009-Dec. 4, 2009, Conference Location: Honolulu, HI, ISBN: 978-1-4244-5626-0; INSPEC Accession No. 11036811.*

(Continued)

*Primary Examiner* — Faruk Hamza
*Assistant Examiner* — Shah R Zaman
(74) *Attorney, Agent, or Firm* — Murphy, Bilak & Homiller, PLLC

(57) ABSTRACT

The present invention relates to a method in a radio equipment unit for downlink radio communication with a UE of a radio network. The radio equipment unit provides radio communication with UE in at least one cell, and is connected to a radio equipment control unit controlling the radio communication. The method comprises receiving (610) from the radio equipment control unit: baseband processed user related data and information indicating a frequency radio resource allocated for a transmission to the UE. The method also comprises generating (620) cell defining signals for the cell of the UE, and transmitting (630) the generated cell defining signals added to the baseband processed user related data to the UE, using the indicated frequency radio resource. The present invention also relates to a corresponding method in the radio equipment control unit and to the units themselves.

14 Claims, 11 Drawing Sheets

(51) Int. Cl.
*H04L 5/00* (2006.01)
*H04L 25/03* (2006.01)
*H04W 88/08* (2009.01)
*H04W 72/04* (2009.01)

(56) References Cited

U.S. PATENT DOCUMENTS

| | | | |
|---|---|---|---|
| 2010/0016013 A1* | 1/2010 | Kabashima et al. | 455/552.1 |
| 2011/0077020 A1* | 3/2011 | Zangi | 455/453 |
| 2011/0310941 A1 | 12/2011 | Kenington | |
| 2013/0028109 A1* | 1/2013 | Jongren et al. | 370/252 |
| 2013/0044707 A1* | 2/2013 | Chen | 370/329 |
| 2014/0241186 A1* | 8/2014 | Garcia | 370/252 |

FOREIGN PATENT DOCUMENTS

| | | |
|---|---|---|
| CN | 102223717 A | 10/2011 |
| EP | 2173136 A1 | 4/2010 |
| GB | 2404527 A | 2/2005 |

OTHER PUBLICATIONS

Jungnickel, V. et al., "Coordinated Multipoint Trials in the Downlink," 2009 IEEE Globecom Workshops, Nov. 30, 2009, pp. 1-7, Honolulu, Hawaii, USA.

Sharp, "Relay Considerations for LTE—Advanced," 3GPP TSG-RAN WG1#54 R1-082788, Aug. 22, 2008, pp. 1-10, Jeju Island, Korea.

NTT Docomo, "On the need for additional carrier types in Rel-11 CA," GPP TSG RAN WG1 Meeting #66bis, R1-113289, Oct. 14, 2011, pp. 1-4, Zhuhai, China.

Samsung, "DMRS Scrambling for Downlink CoMP," 3GPP TSG RAN WG1 #67, R1-114226, Nov. 18, 2011, pp. 1-4, San Francisco, USA.

Apple, Inc. "On the Structure and Usage Scenarios of ePDCCH," 3GPP TSG RAN WG1 Meeting #67, R1-114300, Nov. 18, 2011, pp. 1-10, San Francisco, USA.

* cited by examiner

METHODS AND NODES FOR RADIO COMMUNICATION WITH A USER EQUIPMENT

TECHNICAL FIELD

The disclosure relates to a distributed Radio Base Station (RBS), and more specifically to methods and nodes in a distributed RBS, for downlink and uplink radio communication with user equipment.

BACKGROUND

3GPP Long Term Evolution (LTE) is the fourth-generation mobile communication technologies standard developed within the $3^{rd}$ Generation Partnership Project (3GPP) to improve the Universal Mobile Telecommunication System (UMTS) standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an UTRAN and an E-UTRAN, a User Equipment (UE) is wirelessly connected to a Radio Base Station (RBS) commonly referred to as a NodeB (NB) in UMTS, and as an evolved NodeB (eNodeB or eNB) in LTE. An RBS is a general term for a radio network node capable of transmitting radio signals to a UE and receiving signals transmitted by a UE.

FIG. 1 illustrates a radio access network in an LTE system. An eNB 101a serves a UE 103 located within the RBS's geographical area of service or the cell 105a. The eNB 101a is directly connected to the core network. The eNB 101a is also connected via an X2 interface to a neighboring eNB 101b serving another cell 105b. Although the eNBs of this example network serves one cell each, an eNB may serve more than one cell. An advantage of having one eNB serving multiple cells, is that the eNB hardware and software resources may be shared among the served cells.

In many cellular systems the physical radio resources on the air interface are shared among a plurality of active users based on their immediate need for communications. One such system is the LTE system, which will be used in the further description as an example. E-UTRAN uses Orthogonal Frequency Division Multiplexing (OFDM) in the downlink (DL) from an eNB to UEs, and discrete Fourier transform (DFT)-spread OFDM in the uplink (UL) from a UE to an eNB.

The basic LTE downlink physical radio resource may be seen as a time-frequency grid as illustrated in FIG. 2, where each resource element, i.e. each square in the grid, represents one OFDM subcarrier during one OFDM symbol interval. In the time domain, LTE downlink transmissions are organized into radio frames of 10 ms, each radio frame consisting of ten equally-sized subframes of length 1 ms, as illustrated in FIG. 3a. One subframe is also called the Transmission Time Interval (TTI), and comprises two time slots of 0.5 ms each. The scheduling process, i.e. the process of assigning resources on the physical radio resource to the active users in a cell based on their respective need for communication, generally assigns resources for a period of one subframe, which thus constitutes a TTI. The scheduling process is therefore repeated for each TTI.

Furthermore, the resource allocation in LTE is typically described in terms of resource blocks, also called Physical Resource Blocks (PRB), where a resource block corresponds to one timeslot of 0.5 ms in the time domain and twelve contiguous subcarriers in the frequency domain, as illustrated in FIG. 3b.

One measure for handling an increasing traffic load in a cellular system is to introduce more cells. However, the difficulty in finding sites may be limiting the deployment of additional cells. One way of increasing the number of cells with a fixed set of RBS sites is the introduction of distributed RBS architecture, with distributed Radio Equipment (RE) that share the same Radio Equipment Control (REC) on the RBS site. In this approach antennas and REs 112a-f are spread to support radio communication with UEs 150a-f in different cells A-E, as illustrated in FIG. 4a, while the control of the communication with the UEs is made by the REC 114. The architecture of this type of RBS is illustrated in FIG. 4b with the REC 114 connected to the spaced apart REs 112 via a standardized interface named the Common Public Radio Interface (CPRI). The RE may provide radio communication with UEs in one or more cells. The REC communicates baseband signals and control information over the CPRI, and handles all baseband processing of transmitted and received signals, and further controls the communications in the cells. The REC may have less capacity enabled than needed to support the complete set of REs simultaneously. The CPRI allows for a flexible construction and building of a RBS.

There is thus a trend in the industry to build RBSs with the above described architecture to serve large areas. One of the main reasoning behind the trend is that it is possible to pool baseband processing resources in the REC as the traffic load often is unevenly distributed over the cells. Many cells may have no or a minor load during long durations, while other cells serving UEs that are generating high traffic are heavily loaded. The idea is thus to utilize the baseband processing resources in the REC for the cells in which the traffic is currently happening. The migration of traffic is very often on hourly basis, e.g. following the work hours. A key performance parameter in this kind of RBS is the number of cells possible to serve. A key issue is therefore to minimize the cost for a low load cell.

However, although the baseband processing resources may be more efficiently used in an RBS architecture with an REC and distributed REs, such an RBS has some disadvantages. The need for capacity on the CPRI link between the REC and the REs increases with the number of cells served by the RBS, as a DL cell requires continuous transmission of cell defining signals, such as reference signals. Furthermore, in UL, the RE forwards a continuous flow of In phase/Quadrature (IQ) samples to the REC for baseband processing, even though no user related data is received in the RE.

SUMMARY

It is therefore an object to address some of the problems outlined above, and to provide a solution where functionality is moved from the REC to the RE, making it possible to scale the baseband processing resources, and the capacity of the link to the radio equipment units with the traffic need, rather than with the number of served cells. This object and others are achieved by the methods, the radio equipment control unit and the radio equipment unit according to the independent claims, and by the embodiments according to the dependent claims.

In accordance with a first embodiment, a method in a radio equipment control unit for downlink radio communication with user equipment of a radio network is provided. The radio equipment control unit controls the radio communication and is connected to two or more radio equipment units, each providing radio communication in at least one cell. The method comprises receiving user related data from the network for a downlink transmission to a user equipment in a cell, and baseband processing the user related data. The method also comprises forwarding the baseband processed user related data and information indicating a frequency radio resource allocated for the downlink transmission. The baseband processed user related data is forwarded to one of the at least two radio equipment units providing radio communication in the cell of the user equipment, for generation and addition of cell defining signals before the downlink transmission.

In accordance with a second embodiment, a method in a radio equipment unit for downlink radio communication with a user equipment of a radio network is provided. The radio equipment unit provides radio communication with user equipment in at least one cell, and is connected to a radio equipment control unit controlling the radio communication. The method comprises receiving from the radio equipment control unit: baseband processed user related data and information indicating a frequency radio resource allocated for a transmission to the user equipment. The method further comprises generating cell defining signals for the cell of the user equipment, and transmitting the generated cell defining signals added to the baseband processed user related data to the user equipment, using the indicated frequency radio resource.

In accordance with a third embodiment, a method in a radio equipment unit for uplink radio communication with user equipment of a radio network is provided. The radio equipment unit provides radio communication with user equipment in at least one cell. The radio equipment unit is connected to a radio equipment control unit controlling the radio communication. The method comprises receiving a request for uplink user related data from the radio equipment control unit, the request comprising information indicating a time and frequency radio resource scheduled for the user related data. The method also comprises receiving a signal from a user equipment in a cell, and extracting user related data from the received signal based on the indicated time and frequency radio resource. The method further comprises forwarding the extracted user related data to the radio equipment control unit.

In accordance with a fourth embodiment, a method in a radio equipment control unit for uplink radio communication with a user equipment of a radio network is provided. The radio equipment control unit controls the radio communication and is connected to at least two radio equipment units each providing radio communication in at least one cell. The method comprises sending a request for uplink user related data to one of the at least two radio equipment units providing radio communication in a cell of a user equipment associated with the user related data. The request comprises information indicating a time and frequency radio resource scheduled for the user related data. The method further comprises receiving the user related data from the radio equipment unit in response to the request, and baseband processing the received user related data.

In accordance with a fifth embodiment, a radio equipment control unit for downlink radio communication with user equipment of a radio network is provided. The radio equipment control unit is configured to control the radio communication and is connectable to at least two radio equipment units each providing radio communication in at least one cell. The radio equipment control unit comprises a first communicating unit configured to receive user related data from the network for a downlink transmission to a user equipment in a cell, and a processing circuit configured to baseband process the user related data. The radio equipment control unit also comprises a second communicating unit configured to forward the baseband processed user related data and information indicating a frequency radio resource allocated for the downlink transmission, to one of the at least two radio equipment units providing radio communication in the cell of the user equipment, for generation and addition of cell defining signals before the downlink transmission.

In accordance with a sixth embodiment, a radio equipment unit for downlink radio communication with a user equipment of a radio network is provided. The radio equipment unit is configured to provide radio communication with user equipment in at least one cell. The radio equipment unit is connectable to a radio equipment control unit controlling the radio communication. The radio equipment unit comprises a communicating unit configured to receive from the radio equipment control unit: baseband processed user related data and information indicating a frequency radio resource allocated for transmission to the user equipment. The radio equipment unit also comprises a processing circuit configured to generate cell defining signals for the cell of the user equipment, and a transmitter configured to transmit the generated cell defining signals added to the baseband processed user related data to the user equipment, using the indicated frequency radio resource.

In accordance with a seventh embodiment, a radio equipment unit for uplink radio communication with user equipment of a radio network is provided. The radio equipment unit is configured to provide radio communication with user equipment in at least one cell, and is connectable to a radio equipment control unit controlling the radio communication. The radio equipment unit comprises a communicating unit configured to receive a request for uplink user related data from the radio equipment control unit, the request comprising information indicating a time and frequency radio resource scheduled for the user related data. The radio equipment unit further comprises a receiver configured to receive a signal from a user equipment in a cell, and a processing circuit configured to extract user related data from the received signal based on the indicated time and frequency radio resource. The communicating unit is further configured to forward the extracted user related data to the radio equipment control unit.

In accordance with an eighth embodiment, a radio equipment control unit for uplink radio communication with a user equipment of a radio network is provided. The radio equipment control unit is configured to control the radio communication and is connectable to at least two radio equipment units each providing radio communication in at least one cell. The radio equipment control unit comprises a communicating unit configured to send a request for uplink user related data to one of the at least two radio equipment units providing radio communication in a cell of a user equipment associated with the user related data. The request comprises information indicating a time and frequency radio resource scheduled for the user related data. The communicating unit is further configured to receive the user related data from the radio equipment unit in response to the request. The radio equipment control unit also comprises a processing circuit configured to baseband process the received user related data.

An advantage of embodiments is that RBSs with the proposed distributed architecture can support a greater number of cells, while still keeping baseband processing resources and link capacity to the radio equipment units at a reasonable level.

Another advantage of embodiments is that the link usage and baseband processing is controlled by the radio equipment control unit. Furthermore, the link capacity need is minimized while still maintaining the possibility to do joint UL baseband processing of user data received from antennas at the same radio equipment unit and at different radio equipment units.

Other objects, advantages and features of embodiments will be explained in the following detailed description when considered in conjunction with the accompanying drawings and claims.

DETAILED DESCRIPTION

In the following, different aspects will be described in more detail with references to certain embodiments of the invention and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while embodiments of the invention are primarily described in the form of methods and nodes, they may also be embodied in a computer program product as well as in a system comprising a computer processor and a memory coupled to the processor, wherein the memory is encoded with one or more programs that may perform the functions disclosed herein.

Figure 1:
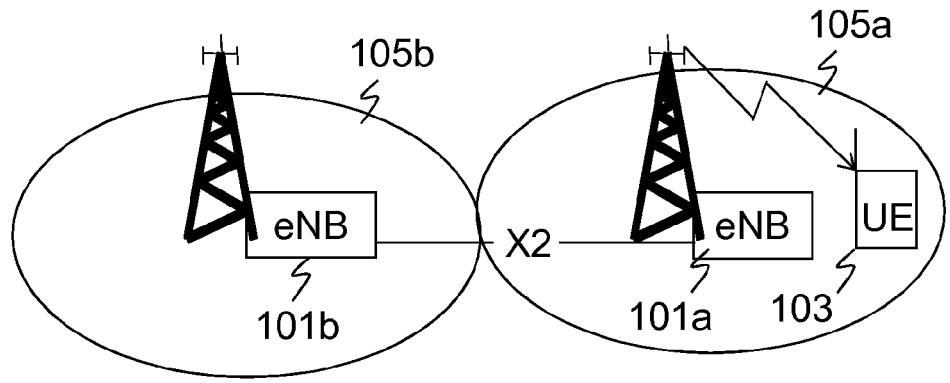
FIG. 1 is a schematic illustration of a radio access network in LTE.
Figure 2:
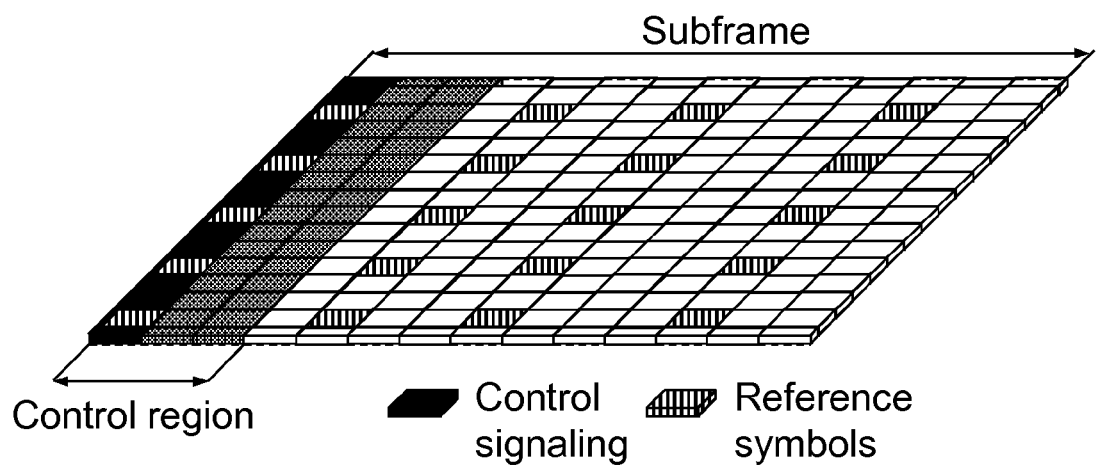
FIG. 2 is a schematic illustration of a time-frequency resource grid in LTE.
Figure 3A:
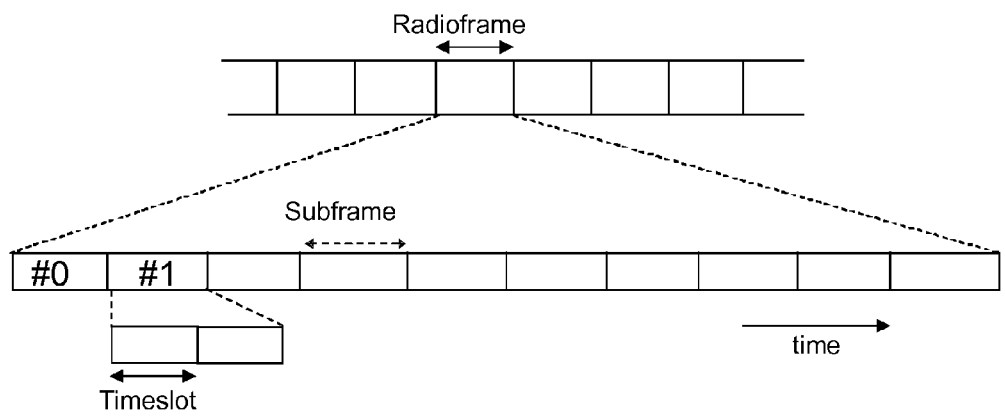
FIG. 3a is a schematic illustration of a radio frame.
Figure 3B:
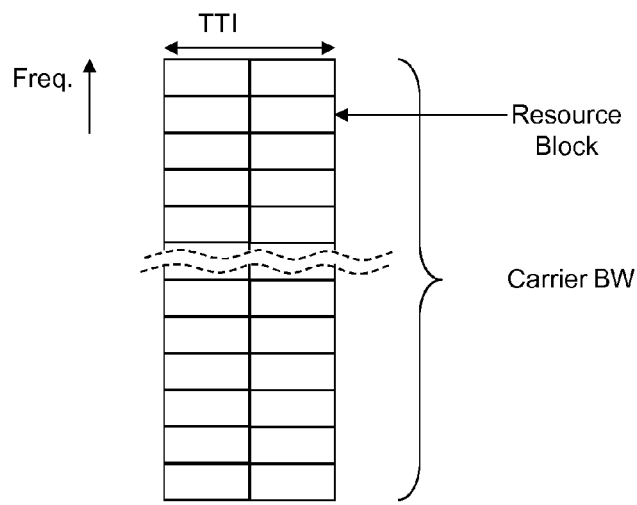
FIG. 3b is a schematic illustration of a physical resource block.
Figure 4A:
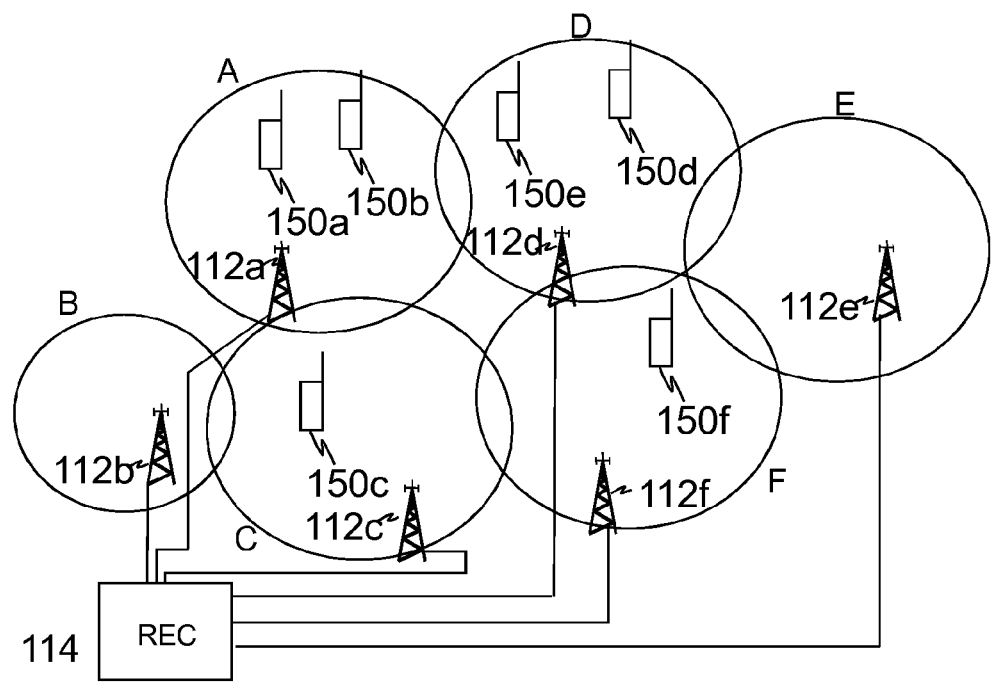
FIGS. 4a-d are block diagrams schematically illustrating distributed RBS architectures.

Embodiments are described in a non-limiting general context in relation to an example scenario with distributed RBS architecture in E-UTRAN, such as the network scenario illustrated in FIG. 4a. However, it should be noted that the embodiments may be applied to any radio access network technology similar to an E-UTRAN, i.e. which has a time division multiplexing component. In E-UTRAN transmissions between UE and RBS are not continuous in time and time scheduling of the transmissions is controlled by the RBS.

Figure 4B:
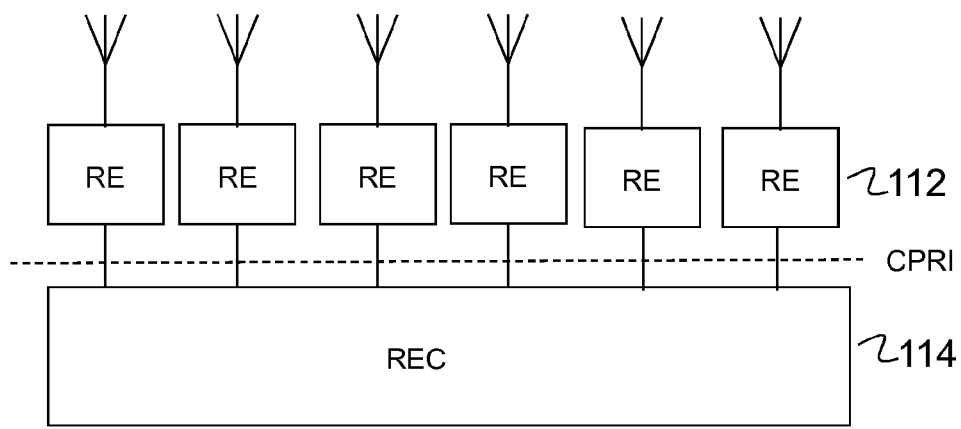

The point of departure when describing embodiments of the present invention is the RBS architecture illustrated in FIG. 4b, with the REC 114 connected to the spaced apart REs 112 via the standardized CPRI interface. The problem of the capacity need on the CPRI link and the baseband resources that scale with the number of cells, even though user traffic may be moderate, is addressed by a modified RBS architecture, where functionality and responsibilities are moved from the REC to the RE. The modified REC and RE will in the following be referred to as a radio equipment control unit and a radio equipment unit respectively. The interface between the units is in this embodiment of the modified architecture no longer compliant with the CPRI interface.

Both UL and DL radio communication is addressed to obtain the full advantage. In UL, baseband resources in the radio equipment control unit and capacity on the link between the radio equipment control unit and the radio equipment unit are allocated only for subframes where UL signal processing is necessary, i.e. for subframes comprising user related data such as random access data or scheduled UL data. One subframe corresponds to one TTI in E-UTRAN, as already described above. Similarly in DL, baseband resources and capacity on the link are only allocated to subframes where non-trivial transmission is required, such as to subframes comprising scheduled DL data or channel state information. In E-UTRAN, the user related data may be transferred using time domain samples as specified by CPRI, but to further save link capacity and to simplify the implementation in both ends, it is preferred to send the user related data as frequency domain samples, complemented or as response to information about a carrier frequency offset.

Cell defining signals comprising e.g. reference signals, need to be continuously transmitted for all cells in the DL, in order for the UEs to properly measure the cells. However, such cell defining signals are trivial and repetitive and can thus be generated by a DL "filling generator", which is preferably placed in the radio equipment unit. In this way, only a small part of the UL and DL subframes that are normally processed in the REC need to be processed in the proposed radio equipment control unit, and need to be transferred over the link between the units. For empty subframes, i.e. subframes where no user related data is present, no processing is needed in the radio equipment control unit, as the filling generator placed in the radio equipment unit generates the cell defining signals which are transmitted via the radio equipment unit's transmitter.

DL control channels such as Physical Downlink Control Channel (PDCCH), and Physical Control Format Indicator Channel (PCFICH), where PCFICH indicates the size of PDCCH, may be generated in the radio equipment unit when no user related data is to be transmitted. However, if there is user related data to transmit, there are two alternatives for the generation of PDCCH:
  i) The radio equipment control unit sends complementary PDCCH to the radio equipment unit, and the radio equipment unit compiles a complete PCFICH and PDCCH for the subframe.
  ii) The radio equipment control unit sends a complete PCFICH and PDCCH for the subframe to the radio equipment unit, which uses this instead of any own generated PCFICH and PDCCH.

Although the gain of letting the radio equipment unit generate the PDCCH is 30-50 bits for each allocation, it is preferred to have the radio equipment control unit generate the signals, as this will allow adopting future (yet unknown) standardized features for PDCCH and PCFICH generation without impacting the radio equipment unit.

The filling generator may be implemented as a baseband processing unit, such as a Digital Signal Processor (DSP) or a general Central Processing Unit (CPU). To minimize the cost and complexity in the radio equipment unit, the filling generator can alternatively be implemented as a set of programmable memories, each memory defining the filling data output in a subframe. The radio equipment control unit programs the memories and their loop order at an earlier stage and the radio equipment unit loops through them accordingly. Yet another alternative implementation is to use Field-Programmable Gate Array (FPGA) technology. The important aspect is that the filling generator is upgradable to handle future releases of the E-UTRAN, and programmable to send out the correct cell defining signals.

As an alternative embodiment, it is possible to place the filling generator in the radio equipment control unit. In DL, this would mean that the cell defining signals are added to the baseband processed user related data before forwarding the user related data to the radio equipment unit. In this way, the resources for baseband processing in the radio equipment control unit may be dimensioned to support the traffic amount, unaffected by the number of cells deployed, while the interface between the radio equipment control unit and the radio equipment unit is still CPRI compliant. In still another alternative embodiment, the radio equipment control unit may generate cell defining signals when there is user related data to transmit in DL, and the radio equipment unit may generate the cell defining data in all other cases. These alternatives will not be further addressed hereinafter.

In embodiments of the invention, the radio equipment control unit is responsible for requesting downlink transmission and uplink reception of user related data from the radio equipment unit. The radio equipment unit is responsible for filling in any required transmission of cell defining signals, and to follow the requests from the radio equipment control unit.

In DL, the radio equipment control unit sends sufficient information to the radio equipment unit for the transmission, i.e. the baseband processed user related data and information indicating what frequency radio resources that should be used for the downlink transmission. For cell defining signals transmitted in other physical resource blocks, the radio equipment unit generates the filling info. The radio equipment unit may then add the cell defining signals to the user related data, and map the data over the available physical transmitters. The radio equipment control unit may also forward transmitter antenna weights that the radio equipment unit uses when transmitting, in order to obtain a wanted beam forming.

In UL the radio equipment control unit tells the radio equipment unit what part of the spectrum it wants to have samples from. In low load situations, this may for instance only be the random access frequency and time radio resource. In addition, the radio equipment control unit may state a wanted beam forming. The radio equipment control unit may e.g. ask for two IQ sample sets, coming from direction a1 and a2, and the radio equipment unit then reduces the amount of samples coming e.g. from eight antennas to two combined set of samples. This may be used by the radio equipment control unit in case the beam direction for reception is known in advanced and/or when the beam forming gain for a specific user is less than the cost of transferring and processing all the raw antenna samples.

Figure 4C:
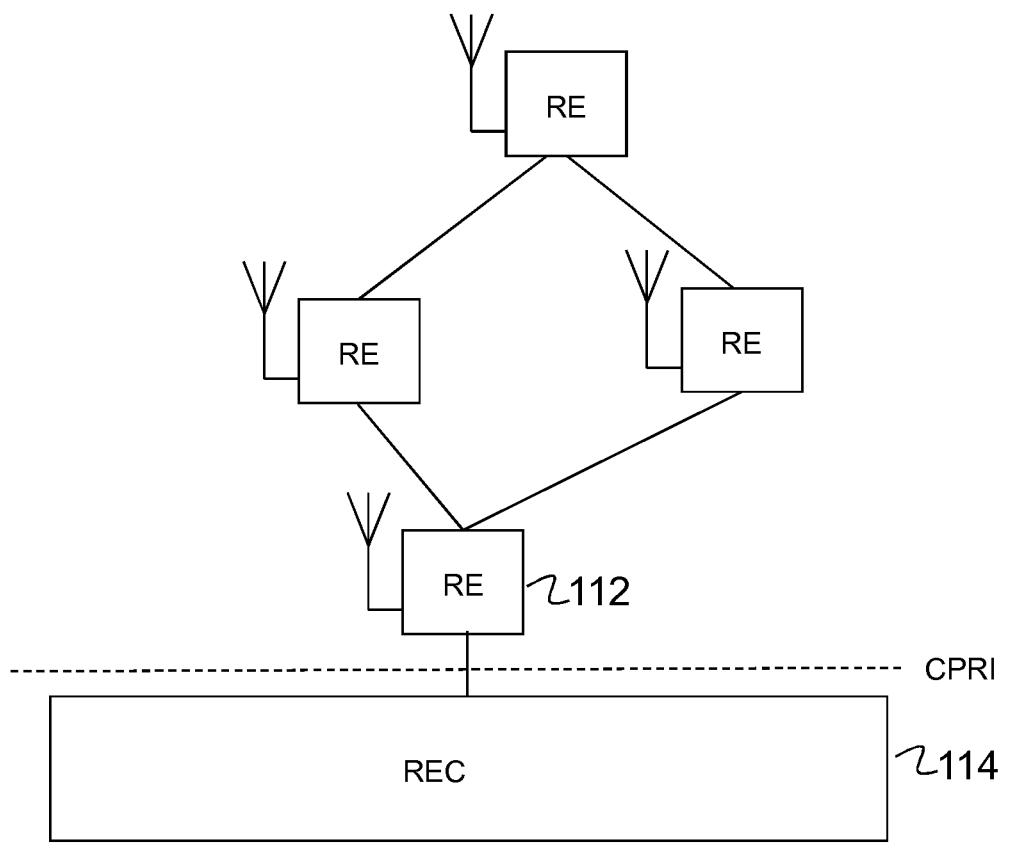

FIG. 4c illustrates a distributed RBS topology where the REs 112 share CPRI bandwidth. If such a topology is used in embodiments of the present invention, the radio equipment control unit is also responsible for taking the available capacity on the link between the radio equipment control unit and the radio equipment unit into account when deciding what user related data to baseband process in downlink, and what data to request from the radio equipment unit. The radio equipment control unit must secure that the available capacity is not overdrawn. This radio equipment control unit must thus select what parts of the link capacity that should be used by which radio equipment units.

Figure 4D:
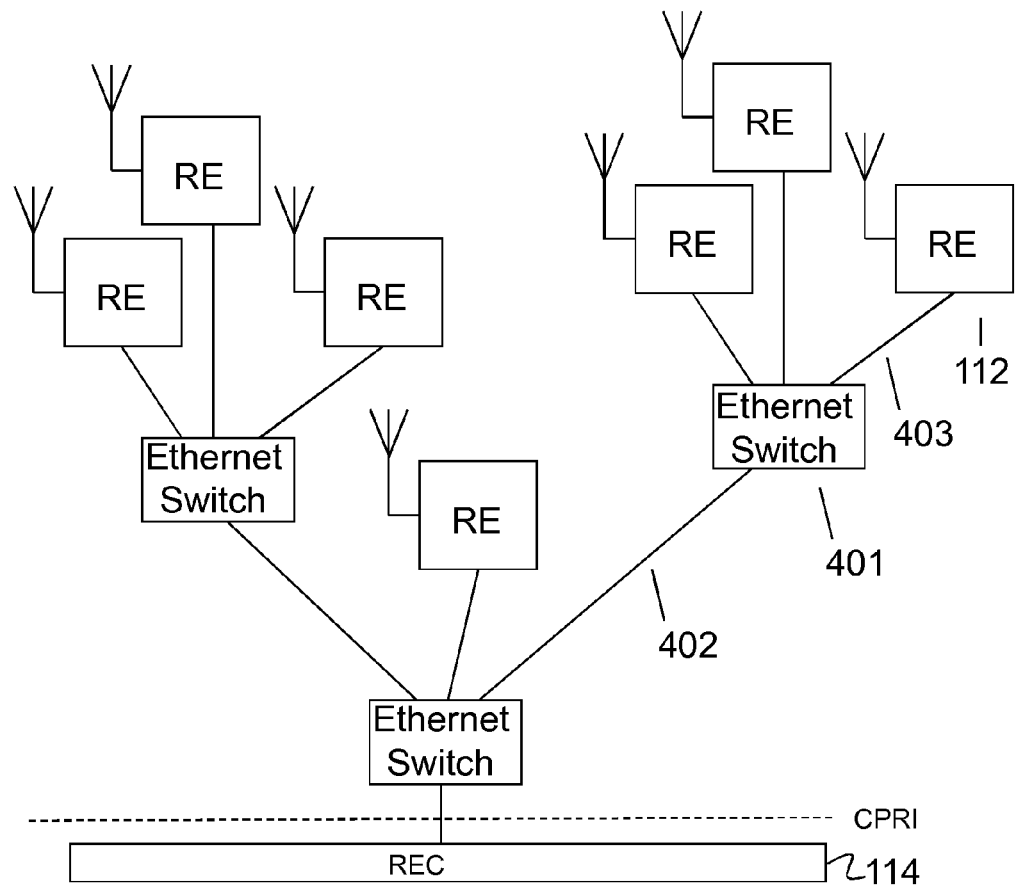

FIG. 4d illustrates an embodiment of a distributed RBS topology using Ethernet transport technology. The radio equipment control unit 114 and the radio equipment units 112 are each equipped with at least one Ethernet interface, to which a switched Ethernet network is connected. The Ethernet network may consist of multiple levels of Ethernet switches 401. The radio equipment control unit must in this case not only ensure that the connections 403 to the radio equipment units are not overbooked, but also that the scheduling decisions generate user data transfer which stays within the capacity of the trunc lines 402. To accomplish this, a scheduler within the radio equipment controller unit is informed about the Ethernet topology and link capacity.

Figure 5:
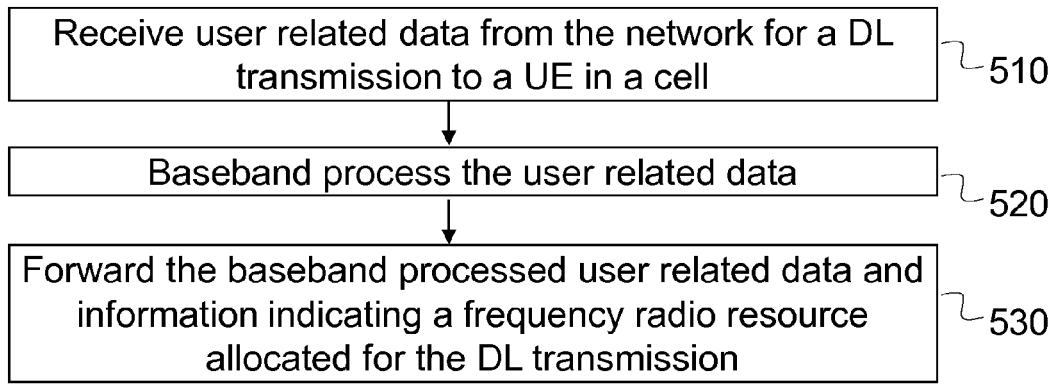
FIGS. 5-6 are flowcharts illustrating the method for downlink transmission in a radio equipment control unit and a radio equipment unit according to embodiments.
Figure 6:
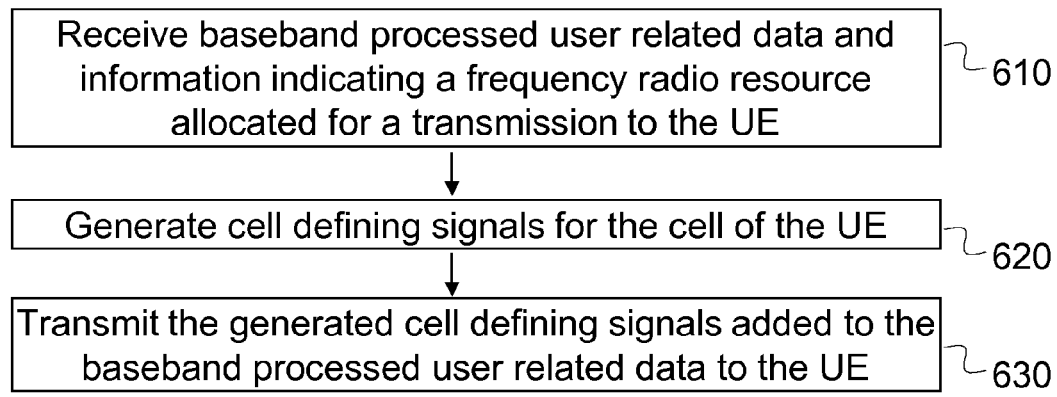

Hereinafter, the methods in the radio equipment control unit and in the radio equipment unit are described with reference to FIGS. 5-8. FIGS. 5-6 relates to downlink radio communication, and FIGS. 7-8 relates to uplink radio communication.

FIG. 5 is a flowchart illustrating an embodiment of a method in the radio equipment control unit for downlink radio communication with UE of a radio network. In one embodiment, the radio network is an LTE network, and the radio equipment control unit is thus a part of an eNodeB. The radio equipment control unit controls the radio communication and is connected to two or more radio equipment units each providing radio communication in one or more cells. The method comprises:

510: Receiving user related data from the network for a downlink transmission to a UE in a cell.

520: Baseband processing the user related data. In one embodiment, the method may further comprise a step of determining an available capacity on a link to the radio equipment units. The decision to baseband process the user related data may then be made by taking the available capacity into account. The radio equipment control unit thus has to check if there is available capacity on the link to the radio equipment unit(s) before deciding whether to baseband process the user related data.

530: Forwarding the baseband processed user related data and information indicating a frequency radio resource allocated for the downlink transmission, to at least one of the radio equipment units. It is the radio equipment unit that is providing radio communication in the cell of the UE that should receive the user related data and the information indicating the frequency radio resource. In a multicast transmission the user related data is transmitted to more than one UE, and may thus be forwarded to more than one radio equipment unit. The radio equipment unit(s) can then generate cell defining signals and add them to the user related data, before the downlink transmission on the indicated frequency radio resource, as will be described with reference to FIG. 6 below.

The user related data may comprise at least one of downlink channel state information, downlink acknowledgements, and scheduled downlink data. Furthermore, the cell defining signals may comprise at least one of synchronization signals, reference signals, and system information.

In one embodiment, the forwarded information indicating the frequency radio resource also comprises transmitter antenna weights. The radio equipment control unit may thus control the beam forming of the downlink transmission. Furthermore, the information indicating the frequency radio resource, alternatively also comprising the antenna weights, may be forwarded for each TTI. In E-UTRAN, the TTI corresponds to a subframe.

In another embodiment, the baseband processed user related data as forwarded relates to the frequency domain, which would typically be the case in E-UTRAN. It is then the radio equipment unit's responsibility to also perform an Inverse Fast Fourier Transform (IFFT) and a cyclic prefix addition.

FIG. 6 is a flowchart illustrating an embodiment of a method in a radio equipment unit for downlink radio communication with a UE of a radio network. The radio equipment unit provides radio communication with UE in one or more cells. The radio equipment unit is connected to a radio equipment control unit controlling the radio communication. The method comprises:

610: Receiving from the radio equipment control unit: baseband processed user related data and information indicating a frequency radio resource allocated for a transmission to the UE. The user related data may comprise at least one of downlink channel state information, downlink acknowledgements, and scheduled downlink data.

620: Generating cell defining signals for the cell of the UE. The cell defining signals may comprise at least one of synchronization signals, reference signals, and system information.

630: Transmitting the generated cell defining signals added to the baseband processed user related data to the UE, using the indicated frequency radio resource.

When no baseband processed user related data is received from the radio equipment control unit, i.e. when the subframe is empty and thus does not comprise any user related data, the radio equipment unit still generates and transmits the cell defining signals, as they always have to be transmitted in the cells.

In one embodiment, the received information indicating the frequency radio resource also comprises transmitter antenna weights. The transmitter antenna weights are used when transmitting the generated cell defining signals added to the received baseband processed user related data. The radio equipment control unit may thus control the beam forming of the downlink transmission by providing antenna combination parameters. Furthermore, the information indicating the frequency radio resource may be received for each TTI, which in LTE corresponds to a subframe.

In another embodiment, the baseband processed user related data as received relates to the frequency domain. The transformation to the time domain is then performed in the radio equipment unit.

Figure 7:
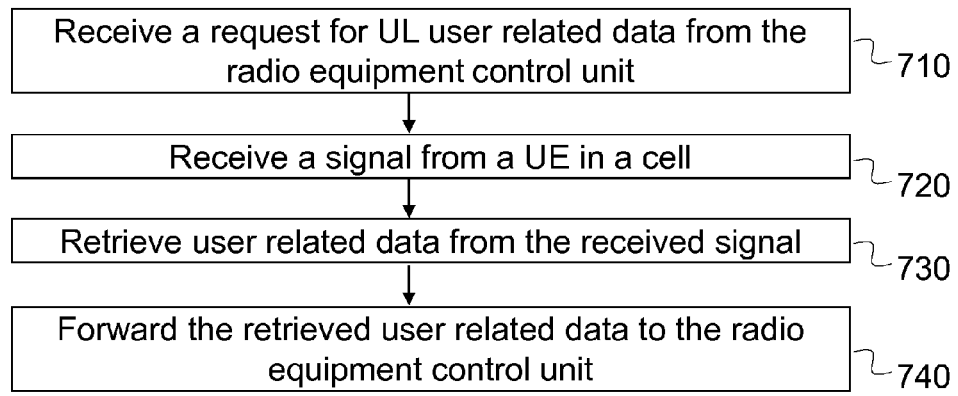
FIGS. 7-8 are flowcharts illustrating the method for uplink transmission in a radio equipment control unit and a radio equipment unit according to embodiments.

FIG. 7 is a flowchart illustrating an embodiment of a method in a radio equipment unit for uplink radio communication with a UE of a radio network. The radio equipment unit provides radio communication with the UE in one or more cells. The radio equipment unit is connected to a radio equipment control unit controlling the radio communication. The method comprises:

710: Receiving a request for uplink user related data from the radio equipment control unit, the request comprising information indicating a time and frequency radio resource scheduled for the user related data. The user related data may comprise at least one of random access data, uplink acknowledgments, and scheduled uplink data.

720: Receiving a signal from a UE in a cell.

730: Extracting user related data from the received signal based on the indicated time and frequency radio resource.

740: Forwarding the extracted user related data to the radio equipment control unit.

The extraction of user related data in step 730 typically results in a set of IQ samples which are forwarded, in step 740, to the radio equipment control unit.

The request may in one embodiment also comprise receiver antenna weights. The extracted user related data may then be combined based on the receiver antenna weights before forwarding to the radio equipment control unit. An advantage of this embodiment is that less information is transmitted on the link between the units. Furthermore, the request may be received for each TTI.

In another embodiment, the request received in step 710 also contains information relating to which baseband resource to send the extracted user related data to. Such information may in an exemplary embodiment contain an Ethernet MAC address or any other address of a baseband resource.

In another embodiment, the extracted user related data as forwarded to the radio equipment control unit relates to the frequency domain. It is then the responsibility of the radio equipment unit to perform the FFT or similar transformation, and to forward the IQ samples related to the frequency domain.

Figure 8:
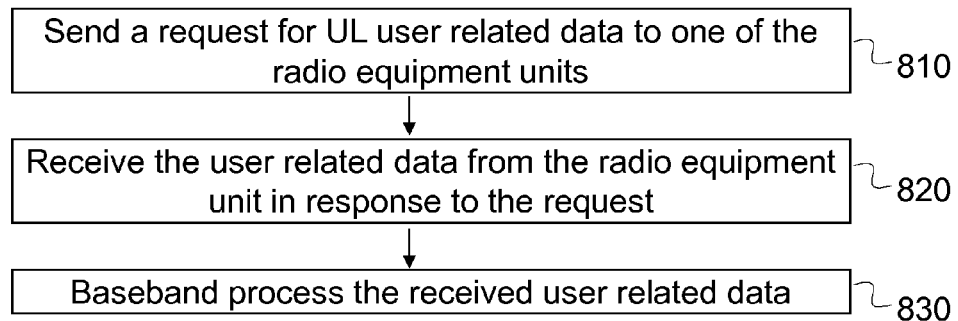

FIG. 8 is a flowchart illustrating an embodiment of a method in the radio equipment control unit for uplink radio communication with UE of a radio network. The radio equipment control unit controls the radio communication and is connected to at least two radio equipment units each providing radio communication in one or more cells. The method comprises:

810: Sending a request for uplink user related data to one of the at least two radio equipment units providing radio communication in a cell of a UE associated with the user related data. In case of a joint reception in more than one UE, the request may be sent to more than one of the radio equipment units. The request comprises information indicating a time and frequency radio resource scheduled for the user related data. The user related data may comprise at least one of random access data, uplink acknowledgments, and scheduled uplink data.

820: Receiving the user related data from the radio equipment unit in response to the request. As described above with reference to steps 730 and 740, the user related data is typically received as a set of IQ samples.

830: Baseband processing the received user related data.

The request may in one embodiment also comprise receiver antenna weights. The radio equipment unit may then combine user related data received on the different antennas based on the receiver antenna weights before forwarding to the radio equipment control unit. Furthermore, the request may be sent for each TTI.

In another embodiment, the user related data as received relates to the frequency domain. This is when the radio equipment unit is responsible for the FFT.

In a further embodiment, the method further comprises determining an available capacity on a link to the radio equipment units. A decision to send the request for user related data may then be made by taking the available capacity into account.

Figure 9A:
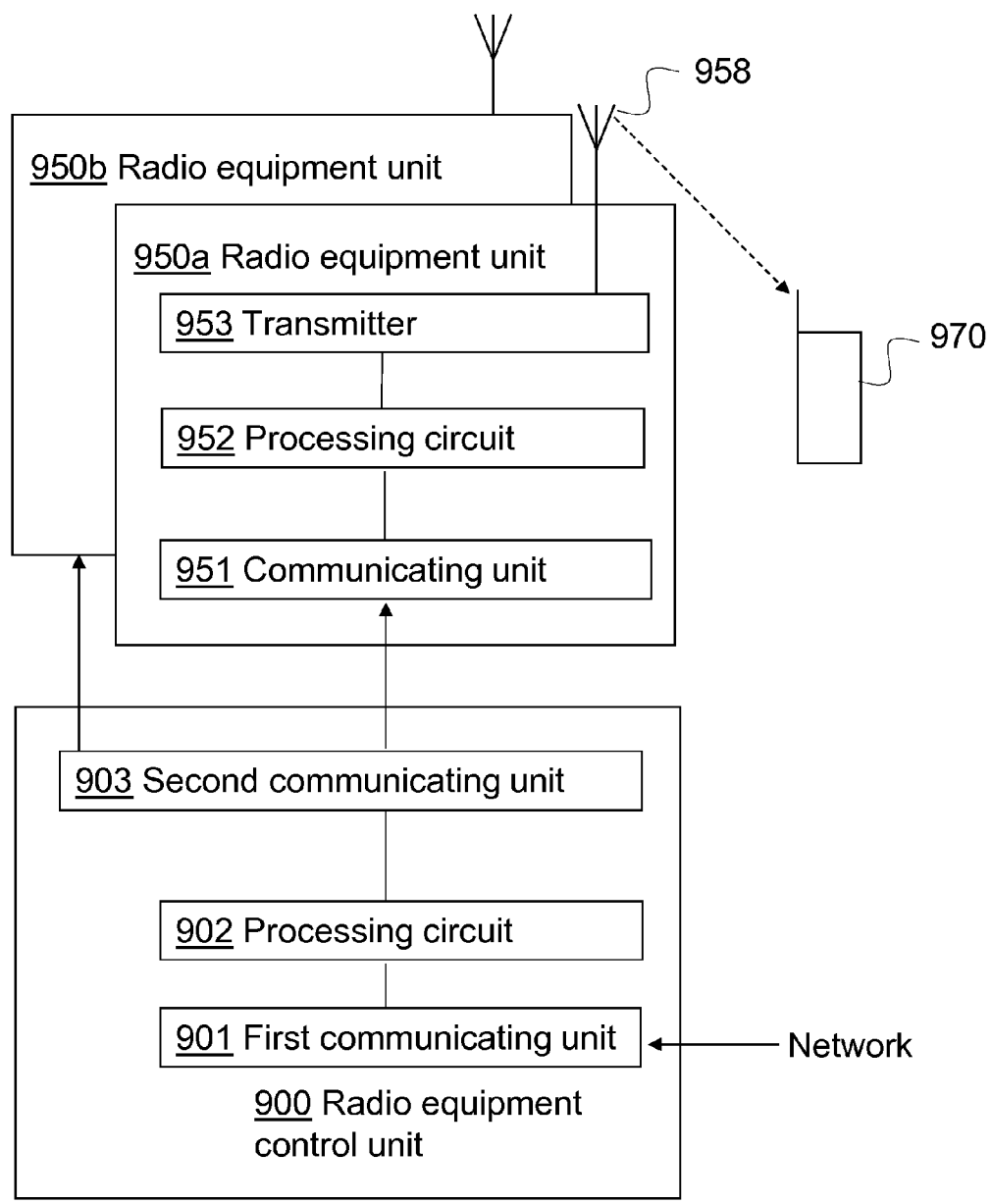
FIGS. 9a-b are block diagrams schematically illustrating a radio equipment control unit and a radio equipment unit according to embodiments.

An embodiment of a radio equipment unit 950a and a radio equipment control unit 900 is schematically illustrated in the block diagram in FIG. 9a, for the downlink case. FIG. 9a illustrates a radio equipment control unit 900 for downlink radio communication with UE of a radio network. The radio equipment control unit is configured to control the radio communication and is connectable to two radio equipment units 950*a-b*, each providing radio communication in at least one cell. The radio equipment control unit 900 comprises a first communicating unit 901 configured to receive user related data from the network for a downlink transmission to a UE 970 in a cell. The radio equipment control unit 900 also comprises a processing circuit 902 configured to baseband process the user related data. The radio equipment control unit 900 further comprises a second communicating unit 903 configured to forward the baseband processed user related data and information indicating a frequency radio resource allocated for the downlink transmission, to one of the at least two radio equipment units 950*a* providing radio communication in the cell of the UE 970, for generation and addition of cell defining signals before the downlink transmission. The user related data may comprise at least one of downlink channel state information, downlink acknowledgements, and scheduled downlink data. Furthermore, the cell defining signals may comprise at least one of synchronization signals, reference signals, and system information.

In one embodiment, the second communicating unit 903 is further configured to forward information comprising transmitter antenna weights to the one of the radio equipment units 950*a* providing radio communication in the cell of the UE 970. In still another embodiment, the second communicating unit 903 is configured to forward the information indicating the frequency radio resource for each TTI. The second communicating unit 903 may be configured to forward the baseband processed user related data as is provided in the frequency domain.

In one embodiment, the processing circuit 902 is further configured to determine an available capacity on a link to the two radio equipment units 950*a-b*, and to make a decision to baseband process the user related data by taking the available capacity into account.

FIG. 9*a* also illustrates a radio equipment unit 950*a* for downlink radio communication with a UE of a radio network. The radio equipment unit 950*a* is configured to provide radio communication with UE in at least one cell, and is connectable to a radio equipment control unit 900 controlling the radio communication. The radio equipment unit 950*a* comprises a communicating unit 951 configured to receive from the radio equipment control unit 900:
  baseband processed user related data, and
  information indicating a frequency radio resource allocated for transmission to the UE.

The radio equipment unit 950*a* also comprises a processing circuit 952 configured to generate cell defining signals for the cell of the UE 970. The radio equipment unit 950*a* further comprises a transmitter 953 configured to transmit the generated cell defining signals added to the baseband processed user related data to the UE 970, using the indicated frequency radio resource. The transmitter 953 is connected via an antenna port to one or more transmitter antennas 958. The user related data may comprise at least one of downlink channel state information, downlink acknowledgements, and scheduled downlink data. Furthermore, the cell defining signals may comprise at least one of synchronization signals, reference signals, and system information.

In one embodiment, the communicating unit 951 is configured to receive also transmitter antenna weights from the radio equipment control unit 900. The transmitter 953 is in this embodiment configured to use the transmitter antenna weights when transmitting the generated cell defining signals added to the received baseband processed user related data.

In another embodiment, the communicating unit 951 is configured to receive the information indicating the frequency radio resource for each TTI. The communicating unit 951 may be configured to receive the baseband processed user related data as is provided in the frequency domain.

Figure 9B:
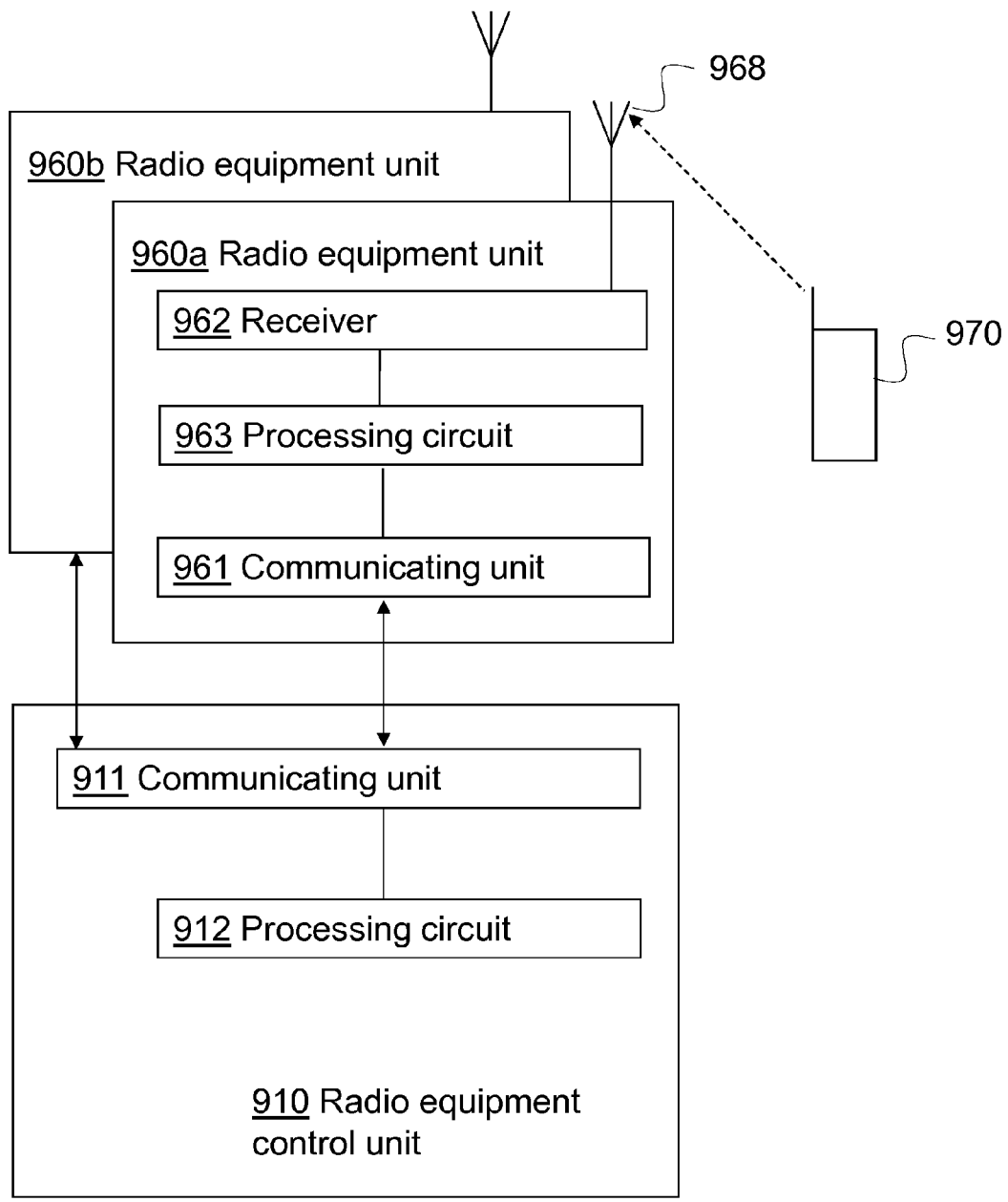

An embodiment of a radio equipment unit 960*a* and a radio equipment control unit 910 is schematically illustrated in the block diagram in FIG. 9*b*, for the uplink case. FIG. 9*b* illustrates the radio equipment unit 960*a* for uplink radio communication with UE of a radio network. The radio equipment unit 960*a* is configured to provide radio communication with UE in at least one cell, and is connectable to a radio equipment control unit 910 controlling the radio communication. The radio equipment unit 960*a* comprises a communicating unit 961 configured to receive a request for uplink user related data from the radio equipment control unit 910, the request comprising information indicating a time and frequency radio resource scheduled for the user related data. The radio equipment unit 960*a* also comprises a receiver 962 configured to receive a signal from a UE 970 in a cell, and a processing circuit 963 configured to extract user related data from the received signal based on the indicated time and frequency radio resource. The receiver 962 is connected via an antenna port to one or more receiver antennas 968. The communicating unit 961 is further configured to forward the extracted user related data to the radio equipment control unit 910. The user related data may comprise at least one of random access data, uplink acknowledgments, and scheduled uplink data.

In one embodiment, the request also comprises receiver antenna weights, and the processing circuit 963 is further configured to combine the extracted user related data based on the receiver antenna weights before forwarding to the radio equipment control unit 910.

In another embodiment, the communicating unit 961 is configured to receive the request for each TTI. The communicating unit 961 may be configured to forward the extracted user related data as is provided in the frequency domain.

FIG. 9*b* also illustrates the radio equipment control unit 910 for uplink radio communication with a UE of a radio network. The radio equipment control unit 910 is configured to control the radio communication and is connectable to two radio equipment units 960*a-b* each providing radio communication in at least one cell. The radio equipment control unit 910 comprises a communicating unit 911 configured to send a request for uplink user related data to one of the radio equipment units 961*a* providing radio communication in a cell of a UE 970 associated with the user related data. The request comprises information indicating a time and frequency radio resource scheduled for the user related data. The communicating unit 911 is further configured to receive the user related data from the radio equipment unit 960*a* in response to the request. The radio equipment control unit 910 further comprises a processing circuit 912 configured to baseband process the received user related data. The user related data may comprise at least one of random access data, uplink acknowledgments, and scheduled uplink data.

In one embodiment the request also comprises receiver antenna weights. In a further embodiment, the communicating unit 911 is configured to send the request for each TTI. The communicating unit 911 may be configured to receive the user related data as is provided in the frequency domain.

In one embodiment, the processing circuit 912 is further configured to determine an available capacity on a link to the two radio equipment units, and to make a decision to send the request for user related data by taking the available capacity into account.

The processing circuits and the communicating units, transmitters and receivers, described above with reference to FIGS. 9a-b may be logical units, separate physical units or a combination of both logical and physical units.

In an alternative way to describe the embodiments in FIGS. 9a-b, the radio equipment unit 950a/960a comprises a Central Processing Unit (CPU) which may be a single unit or a plurality of units. Furthermore, the radio equipment unit 950a/960a comprises at least one computer program product (CPP) in the form of a non-volatile memory, e.g. an EEPROM (Electrically Erasable Programmable Read-Only Memory), a flash memory or a disk drive. The CPP comprises a computer program, which comprises code means which when run on the radio equipment unit 950a/960a causes the CPU to perform steps of the procedure described earlier in conjunction with FIGS. 6 and 7 respectively. In other words, when said code means are run on the CPU, they correspond to the processing circuit 952/963 of FIGS. 9a-b.

Furthermore, the radio equipment control unit 900/910 comprises in an alternative way to describe the embodiments, a Central Processing Unit (CPU) which may be a single unit or a plurality of units. Furthermore, the radio equipment control unit 900/910 comprises at least one computer program product (CPP) in the form of a non-volatile memory, e.g. an EEPROM (Electrically Erasable Programmable Read-Only Memory), a flash memory or a disk drive. The CPP comprises a computer program, which comprises code means which when run on the radio equipment control unit 900/910 causes the CPU to perform steps of the procedure described earlier in conjunction with FIGS. 5 and 8 respectively. In other words, when said code means are run on the CPU, they correspond to the processing circuit 902/912 of FIGS. 9a-b.

Figure 10A:
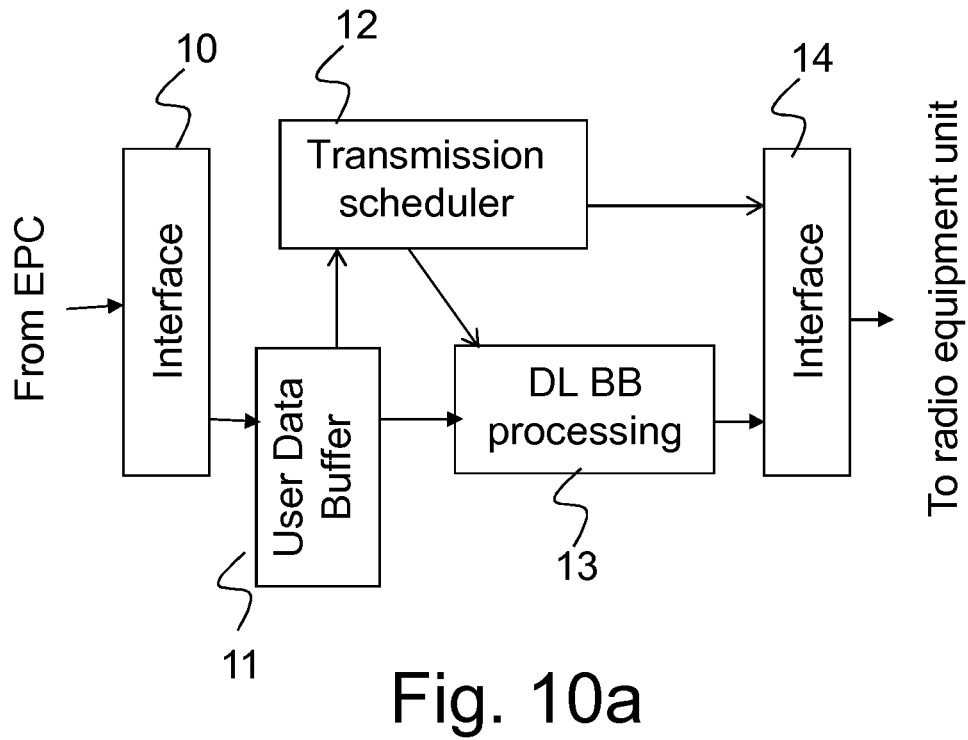
FIGS. 10a-d are block diagrams schematically illustrating a radio equipment control unit and a radio equipment unit according to embodiments.
Figure 10B:
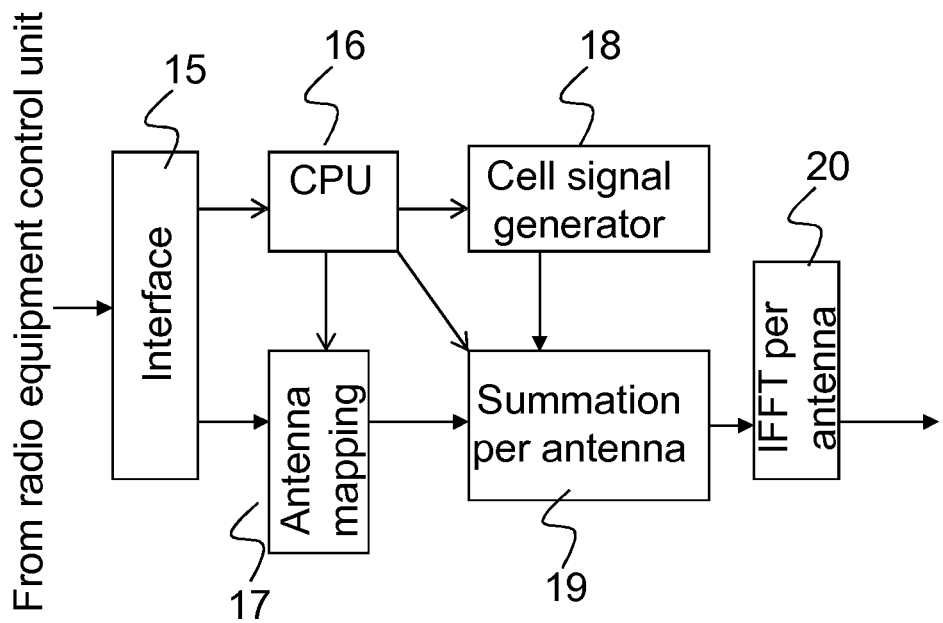

FIGS. 10a-d illustrate one example of how embodiments of the invention may be realized in the radio equipment unit and the radio equipment control unit in LTE. FIGS. 10a-b illustrate the downlink case. In FIG. 10a, illustrating the radio equipment control unit, user related data is received from the Evolved Packet Core (EPC) via an S1 interface 10 of the radio equipment control unit, or from an RBS via an X2 interface, and is stored in a user data buffer 11. A transmission scheduler 12 determines which users to be scheduled in the coming TTI. Information about the selected users and the selected transmission parameters, such as frequency information, antenna weights, and selected radio equipment units, are sent to the baseband (BB) processing 13 as well as to the radio equipment unit via interface 14. The baseband processing 13 fetches the corresponding user related data from the user data buffer 11 and processes it. The baseband processed data is forwarded to the radio equipment unit via the interface 14. Depending on the interface characteristics, the transmission parameters and the BB processed data may be transmitted together or as separate packets, or even split into multiple packets. In case of an Ethernet interface, a selected radio equipment unit may be mapped to an Ethernet MAC address.

In FIG. 10b, illustrating the radio equipment unit, the transmission parameters are received via interface 15 by a processing unit (e.g. a CPU) 16 which may, in response to the received information, configure the cell signal generator 18, the antenna mapping block 17 and the summation per antenna 19. Typically, the cell signal generator 18 is configured at cell startup to generate the correct cell defining signals, including any desired antenna beam, and the transmission parameters received during normal traffic express modifications, such as override of PCFICH and PDCCH. The baseband processed user related data received over interface 15 may consist of one or more data streams, typically different Multiple-Input/Multiple-Output (MIMO) streams. Each such stream is mapped onto physical antennas by the antenna mapping block 17. Different users can have different antenna weights to allow for individual beam forming. The received baseband processed user data is input to the antenna mapping unit 17 which generates one stream of data per physical antenna, e.g. by accumulating the product of input streams sample for each physical antenna multiplied with the stream antenna weight (phase and amplitude coefficient). Each such stream (antenna and user) is fed into a summation per antenna block 19. In case of frequency domain samples for the user related data, as indicated in FIG. 10b, the summation per antenna block 19 simply maps each frequency sample onto the correct input of the IFFT per antenna block 20, by using the frequency information in the transmission parameters. Also the generated cell defining signals are fed into the summation per antenna block 19 and mapped onto the correct input of the IFFT block 20. Synchronous to the cell air interface timing, the IFFT per antenna block 20 generates time domain samples for transmission onto the air. In case of a radio equipment unit working on time domain samples, the summation per antenna block 19 would include digital multipliers multiplying the input signal with a digitally generated carrier at the frequency in the transmission parameters. No IFFT block would then be necessary.

Figure 10C:
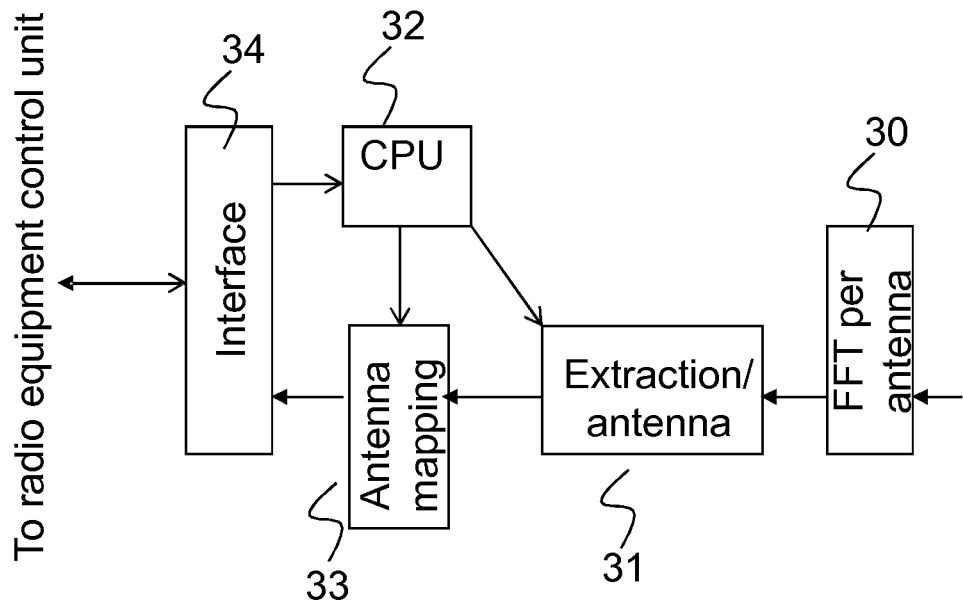
Figure 10D:
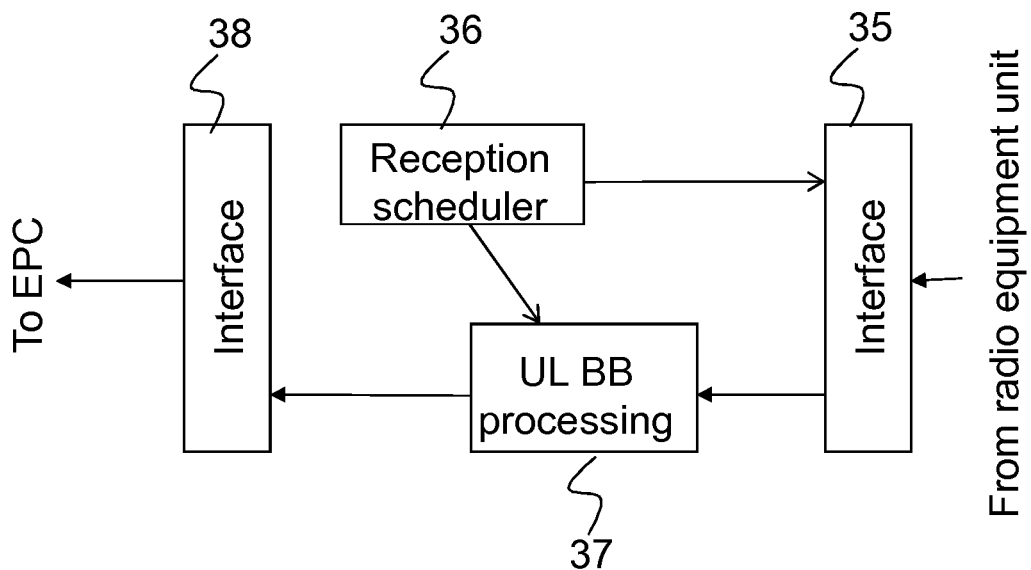

FIGS. 10c-d illustrate the uplink case. In FIG. 10d, illustrating the radio equipment control unit, a reception scheduler 36 determines which users to be scheduled in the coming TTI, and which other data to receive, such as RACH channels, sounding channels, or air interface measurements. Information about the selected users and the selected reception parameters, such as frequency information, antenna weights, selected radio equipment units, and selected baseband processing unit, are sent to the baseband processing 37 and to the radio equipment unit via interface 35, and correspondingly for other data reception. The baseband processing 37 waits for the scheduled user related data to be received on interface 35. Once received the baseband processing 37 processes the data and upon complete reception of a user data packet, sends it to the EPC using interface 38. Similarly, on reception of a layer 3 (L3) message such as an RRC message, the message is forwarded to the L3 processor of the eNodeB (not shown). In response to a non-user related scheduled data reception, the baseband processing 37 waits for the corresponding samples to be received and executes the requested processing. The response is then sent back to the reception scheduler 36. Depending on the interface characteristics, the reception parameters may be transmitted as one or multiple packets. In case of an Ethernet interface, a selected radio equipment unit may be mapped to an Ethernet MAC address.

In FIG. 10c, illustrating the radio equipment unit, the reception parameters are received via interface 34 by a processing unit (e.g. CPU) 32 which may, in response to the received information, configure the antenna mapping block 33 and the extraction per antenna 31. Synchronous with the cell air interface, the FFT per antenna 30 generates frequency domain samples. The extraction per antenna 31 selects the frequency samples which are related to the requested reception, and feeds these into the antenna mapping block 33. The antenna mapping block 33 combines the information from the received physical antennas onto one or more logical antennas, each logical antenna corresponding to an antenna beam, e.g. by means of for each logical antenna sample accumulating the product of physical antennas sample multiplied with that antenna weight (phase and amplitude coefficient). The combination is done according to the requested antenna weights. Each reception request can have its own set of antenna weights. The combined samples are sent on to the interface 34 towards the radio equipment control unit. Depending on the characteristics of the interface, the samples may be sent as one ore more packets. The reception parameters may include a destination baseband processing block within the radio equipment control unit. Such a destination may be mapped onto a Ethernet MAC address. In case of an radio equipment unit working on time domain samples, the extraction per antenna block 31 would include digital multipliers multiplying the input signal with a digitally generated carrier at the frequency in the transmission parameters. No FFT block 30 would then be necessary.

Note that the same transmission or reception scheduling may involve more than one antenna equipment unit. Depending on interface 14 and 35, the data may be multicast to multiple radio equipment units or sent once per radio equipment unit.

The above mentioned and described embodiments are only given as examples and should not be limiting. Other solutions, uses, objectives, and functions within the scope of the accompanying patent claims may be possible.

The invention claimed is:

1. A method performed by a radio base station (RBS) for downlink radio communication with user equipment of a radio network, wherein the RBS comprises a radio equipment control apparatus that controls the radio communication and that is connected to at least two radio equipments, and wherein each of the at least two radio equipments provide radio communication in at least one cell, and wherein the method comprises:
the radio equipment control apparatus receiving user related data from the network for a downlink transmission to a user equipment in one of the at least one cell;
the radio equipment control apparatus performing baseband processing of the user related data;
the radio equipment control apparatus forwarding the baseband processed user related data, without cell-defining signals needed for the downlink transmission, and information indicating a frequency radio resource allocated for the downlink transmission, to one of the at least two radio equipments providing radio communication in the cell of the user equipment;
the one of the at least two radio equipments providing radio communication in the cell of the user equipment generating the cell-defining signals for the cell of the user equipment; and
the one of the at least two radio equipments transmitting the generated cell-defining signals added to the baseband processed user related data to the user equipment, using the indicated frequency radio resource.

2. The method according to claim 1, wherein the forwarded information indicating the frequency radio resource also comprises transmitter antenna weights.

3. The method according to claim 1, wherein the information indicating the frequency radio resource is forwarded for each transmission time interval (TTI).

4. The method according to claim 1, wherein the baseband processed user related data as forwarded relates to the frequency domain.

5. The method according to claim 1, further comprising the radio equipment control apparatus determining an available capacity on a link to the at least two radio equipments, and wherein a decision to baseband process the user related data is made by taking the available capacity into account.

6. The method according to claim 1, wherein the user related data comprises at least one of downlink channel state information, downlink acknowledgements, and scheduled downlink data.

7. The method according to claim 1, wherein the cell-defining signals comprise at least one of synchronization signals, reference signals, and system information.

8. A radio base station (RBS) for downlink radio communication with user equipment of a radio network, wherein the RBS comprises at least two radio equipments and a radio equipment control apparatus connected to the at least two radio equipments, wherein the radio equipment control apparatus is configured to control the radio communication, and each of the at least two radio equipments is configured to provide radio communication with user equipment in at least one cell,
the radio equipment control apparatus comprising:
a first communication interface configured to receive user related data from the network for a downlink transmission to a user equipment in one of the at least one cell;
a first processing circuit configured to baseband process the user related data; and
a second communication interface configured to forward the baseband processed user related data, without cell-defining signals needed for the downlink transmission, and information indicating a frequency radio resource allocated for the downlink transmission, to one of the at least two radio equipments providing radio communication in the cell of the user equipment; and
the one of the at least two radio equipments providing radio communication in the cell of the user equipment comprising:
a third communication interface configured to receive, from the radio equipment control apparatus, the baseband processed user related data and the information indicating a frequency radio resource allocated for transmission to the user equipment;
a second processing circuit configured to generate cell-defining signals for the cell of the user equipment; and
a transmitter configured to transmit the generated cell-defining signals added to the baseband processed user related data to the user equipment, using the indicated frequency radio resource.

9. The RBS according to claim 8, wherein the second communication interface is further configured to forward information comprising transmitter antenna weights to the one of the at least two radio equipments providing radio communication in the cell of the user equipment, and the third communication interface is configured to receive the transmitter antenna weights from the radio equipment control apparatus, and wherein the transmitter is configured to use the transmitter antenna weights when transmitting the generated cell-defining signals added to the received baseband processed user related data.

10. The RBS according to claim 8, wherein the second communication interface is configured to forward the information indicating the frequency radio resource for each transmission time interval (TTI), and the third communication interface is configured to receive the information indicating the frequency radio resource for each TTI.

11. The RBS according to claim 8, wherein the second communication interface is configured to forward the baseband processed user related data as is provided in the frequency domain, and the third communication interface is configured to receive the baseband processed user related data as is provided in the frequency domain.

12. The RBS according to claim 8, wherein the first processing circuit is further configured to determine an available capacity on a link to the at least two radio equipments, and to make a decision to baseband process the user related data by taking the available capacity into account.

13. The RBS according to claim 8, wherein the user related data comprises at least one of downlink channel state information, downlink acknowledgements, and scheduled downlink data.

14. The RBS according to claim 8, wherein the cell-defining signals comprise at least one of synchronization signals, reference signals, and system information.

* * * * *